July 15, 1952　　D. SILVERMAN ET AL　　2,603,415
ELECTRICAL COMPUTER
Filed April 20, 1950
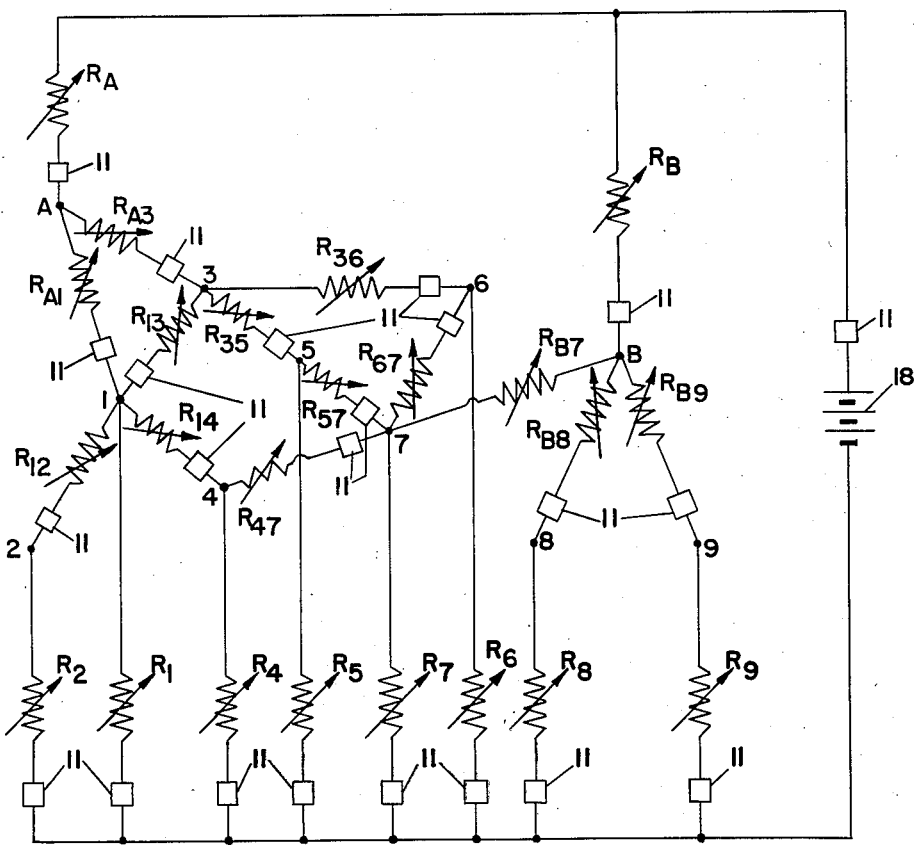
FIG. 1
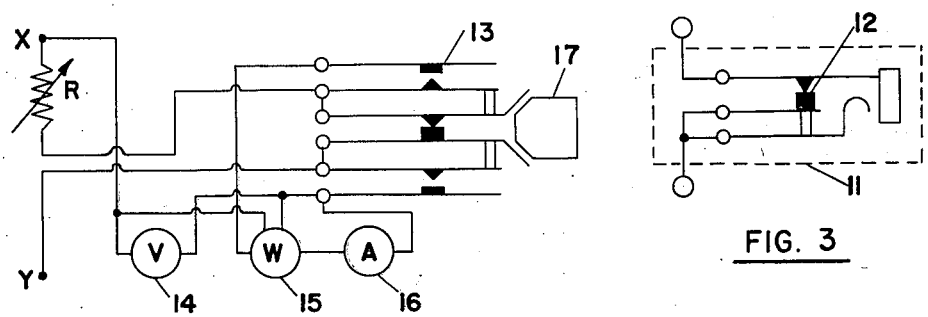
FIG. 2
FIG. 3
INVENTORS
DANIEL SILVERMAN
JOSEPH D. EISLER
JOHN H. HUTH
BY Paul F. Hawley
ATTORNEY Patented July 15, 1952

2,603,415

UNITED STATES PATENT OFFICE 2,603,415

ELECTRICAL COMPUTER

Daniel Silverman and Joseph D. Eisler, Tulsa, Okla., and John H. Huth, Berkeley, Calif., assignors to Stanolind Oil and Gas Company, Tulsa, Okla., a corporation of Delaware Application April 20, 1950, Serial No. 157,122

9 Claims. (Cl. 235—61)

This invention pertains to the art of computers and particularly electric analog computers used for determining economic conditions in a distribution system. Such distribution systems may include the most economical placement of transportation units (pipe lines, barge lines, etc.), the most economical methods of transportation, the most economical placement of sources of supply, or the like.

In general, any distribution system for goods in present-day commerce normally involves more than one originating source of supply, which sources are geographically located at known points, a plurality of choices as to the type of transportation to be employed from each main source to distribution centers or to the ultimate distributor, fairly fixed knowledge as to the amount of goods to be consumed at each final point, and considerable uncertainty as to the most economical method of designing the transportation system or systems to be used. In general, each mode of transportation involves a different rate per unit. Thus, for example, there is a marked difference in cost of transportation per barrel mile of petroleum product, depending on whether pipe lines, barge lines, railroads, or truck lines are used. It is easy to compute the system from one supply point to one consuming source, such as a service station, if no other stations are to be considered, but to secure an overall economy may involve a considerable cut-and-try process.

We have discovered that it is possible to eliminate difficulties with the prior-art systems of determining such matters by the replacement of the system with an electric network in which the various sources of the goods are represented as sources of current, the points of ultimate consumption (equivalent to the service station), which can be generally considered to be use points or sinks, are represented by current sinks, and the transportation elements between sources and use points are electric impedances. The answer can be obtained relatively rapidly to the question which is asked in studying such a distribution system: namely, what arrangement of sources can be provided to permit desired distribution of products at the least total cost of transportation; or, alternatively, given definitely fixed arrangement of sources and use points, what arrangement of transportation methods will involve least total cost of transportation?

One important property of a multimesh electrical network is that the currents in the network adjust themselves in the various branches to bring the total power loss in the network to a minimum. Consequently, if the currents applied to the network are made proportional to product supply and introduced into the network at the supply points or sources, and if current is drawn from the network at each of the use points in direct proportion to the total consumption to be expected at that point, and, finally, if the various resistances or impedances making up the meshes and joining the use points to the supply points are adjusted so that a characteristic is proportional to the cost per unit for transportation between these points, then electrical measurements involving the over-all system can be made in which the results can be made equivalent to the total minimum transportation cost for that particular network. For example, if the impedances or resistances are adjusted so that the voltage drop across them in phase with the supply voltage is proportional to the cost per barrel for transportation, then the total power loss in the network is directly proportional to the total dollars transportation cost. If the resistance of each mesh in the network rather than the voltage drop is made proportional to the cost per barrel, then the voltage drop across the meshes represents the minimum transportation cost.

This invention will be described with particular reference to its application in direct current. The principles involved would be equally true for the in-phase components of an alternating-current network.

A simple network of the type which could be used for the purpose is shown in Figure 1.

Figure 2 represents a useful push-button switching arrangement which can be employed in the network of Figure 1.

Figure 3 shows a simple plug arrangement for current measurements in the network of Figure 1.

The network of the type employed for the analog computer is shown in Figure 1. It divides itself, roughly speaking, into three parts. First, there is a series of adjustable impedances, which may be resistors, connected to the source and so arranged that the current flowing through each of the resistors is directly proportional to the relative amount of goods which is to be supplied from each source. Second, there is a variable impedance, which may be a resistor, for each use point or sink, again being adjustable so that the current flow through each such resistor is directly proportional to the consumption of the goods at each use point. These two sets of adjustable resistors are employed to control the current proportional to the flow of goods and actually do not enter into the computations involved, since they merely determine the initial and ultimate flow of goods rather than the transportation economics of the system.

A third set of resistors, generally adjustable in nature, connect the supply points to the use points. These are called transportation unit resistors. If it is contemplated that a use point will be supplied from two source points, the use point is connected through suitable resistors to each source point and so on. Since in general distribution systems for goods there is a third type of point, which corresponds to the jobbers or wholesalers, i. e., a point through which goods flow from the source point in general to a multiplicity of use points, there may be points in the electrical equivalent network connected to one or more source points by transportation-unit resistors and in turn connected by similar resistors to one or more use points. Finally, if these intermediate points also represent a flow direct to the consuming public, one of the second type of resistor mentioned above would be connected to this point and to the outside source of potential. One end of all of the first type of resistor and one end of all of the second type of resistor are connected, respectively, to the opposite poles of a battery.

Before further consideration of the transportation-unit resistors, one further comment should be made about the first and second type of resistors employed. In general, their magnitude should be preferably at least approximately two orders of magnitude greater than that of the largest transportation-unit resistor. For example, if the transportation-unit resistors are each a maximum of 100 ohms, the source-adjustment resistor and sink-adjustment resistors should preferably be at least 10,000 ohms. This requirement is placed on the resistors so that relatively large changes can be made in the third type of resistor, i. e., the transportation unit resistor, without significantly altering the amount of current flow out of each source or into each use point or sink. It should be realized in passing that ordinary vacuum tubes are now well recognized to serve in one function as adjustable resistors, and, if desired, such vacuum tubes operated as constant-current devices such as, for example, pentode tubes with grid biases adjustable independent of the system, may be employed instead of the first and second type of resistors.

In the simple network shown in Figure 1, a battery 18 supplies current to the network composed of supply points A and B and use points 1, 2, and 4-9. One intermediate jobber point 3 is shown. Current is supplied to the supply points through individually adjustable resistances $R_A$ and $R_B$. It is assumed that these resistors are adjusted with a minimal resistance of about 10,000 ohms in this example. Each of the use points 1 through 9 is connected by individually variable resistances $R_1$, $R_2$, and $R_4$-$R_9$, again with a minimal resistance of about 10,000 ohms, to the opposite pole of the battery 18. A simple suitable arrangement is incorporated in the lines to each of resistors $R_A$, $R_B$, and $R_1$-$R_9$ so that the current flowing through such resistor can be individually measured.

Each transportation-unit resistance joining one of the supply points to a jobber point or use point is designated as resistance $R_{A1}$, etc., with the subscripts referring to the source and sink, respectively. These resistances may suitably be adjustable 100-ohm resistors, the number of which depends entirely upon the paths of available transportation which are to be included in the computation. These resistors are connected between the points in a manner which corresponds to the practical situation to be tested. In general, all use points are not interconnected with each other and with all supply points. Connections are only made when a definite transportation channel is available for use.

In operation, the transportation-unit channels are connected as desired and without any particular adjustment as to resistance, and resistors $R_A$ and $R_B$ are adjusted to divide the flow of current in direct proportion to the amount of goods which are to flow from each source point A, B, and the like. For example, if source A is to supply two-thirds of the total goods and B one-third, resistance $R_B$ may be adjusted to 20,000 ohms and $R_A$ to 10,000 ohms. An ammeter or the like can be inserted in each of these resistances to check the relative amount of current flowing. Use-point resistors $R_1$, $R_2$, and $R_4$-$R_9$ are then adjusted so that the current flowing through each such resistor is directly proportional to the relative amount of consumption of the goods to be expected at each use point. Thus, if half the use stations are expected to consume twice the amount of goods as the other half, the resistance of the second half of the resistors would be twice that of the first half.

With these adjustments made, the network is now ready for adjustment of the transportation-unit resistors to make the economic study. Two possible adjustments of these transmission-unit resistors can be made. In one, the preferred system, the voltage drop across the various transportation-unit resistors is adjusted to be directly proportional to the cost of transporting one unit of the goods, hereinafter called "the cost of transportation." When such adjustment has been made by means of a suitable voltmeter, preferably with an internal resistance at least one thousand times that of the transportation-unit resistors, the power consumed in the individual transportation-unit resistors (the product of the voltage drop across the resistor multiplied by the current flow through the resistor) is, in terms of the analogy, the flow of goods times the unit cost of transportation or total dollars transportation cost across that link. It should be noticed in addition that, since the characteristic of such electric networks is that the total power loss is a minimum, the total transportation charge is a minimum for the type of transportation chosen between each source of goods and each use point.

In the second system, each transportation-unit resistance is disconnected temporarily from the network shown in Figure 1 and the resistance thereof adjusted to be directly proportional to the cost of transportation. When it is reconnected into the circuit without altering the resistance, the potential drop across each resistor, representing as it does the product of the resistance and the current flow, is directly proportional to the total dollars transportation charge of the flow of goods through that transportation link and is measured to determine this charge.

If it should be desired to determine whether a slightly different configuration of transportation is more desirable or more economical, it is possible by altering the connection of the various transportation-unit resistors or their magnitudes to determine the effect of both changes in the routes from a source of goods to the use points or a change in the cost of transportation between such points corresponding to the use of a different mode of transportation. It has been found that a change in one such resistor interconnecting any two points will reflect a change in current flow in adjacent legs of a minor nature, but its effect in general is not carried through the entire network so that the adjustment of the source impedances and the use-point impedances can be rapidly taken care of.

Any type of metering which functionally will accomplish the purposes outlined for the network can be employed. Thus, for example, one end of resistor $R_{A3}$ could be opened up and an ammeter connected in series therewith to determine the current flow through this transportation-unit resistor. The same is true of resistors $R_{A1}$, $R_{13}$, $R_{12}$, etc. In Figure 1, each resistor has been shown connected in series with a small unit marked 11, the construction of which is shown in more detail in Figure 3. This is a simple jack of the shorting type in which an ordinary plug can be inserted, opening contacts 12 and thus causing current flow through the resistor to flow through the jack and the attached ammeter. Thus, one ammeter can be used to meter the current flow analogous to the flow of goods through all resistors or other impedances in the network. The voltage drop across a transportation-unit resistor can be directly determined by clipping a voltmeter across it (electronic voltmeters are preferable, but any high-resistance voltmeter will accomplish the purpose). Wattmeters can be connected in each branch simply by the combination of the current and voltage metering discussed immediately above.

A more elaborate metering arrangement, which is more convenient for some purposes, is shown in Figure 2. Here, the transportation-unit resistor which is to be employed at some point in the network is designated simply as R. The two terminals at which it is connected into the circuit are labeled $x$ and $y$. A small multipole pushbutton switch is connected in the circuit as shown to connect in series with and across resistor R, a voltmeter 14, an ammeter 15, and a wattmeter 16. When the push button 17 is in the normal or undepressed condition, current flow from $x$ to $y$ simply passes through R. On the other hand, when the push button 17 is depressed, the current flowing through resistor R flows through the ammeter 15 and wattmeter 16, and the potential drop across this resistor is also impressed across the voltmeter 14 and the voltage connections to wattmeter 16. Accordingly, on pushing this switch, all significant quantities in the circuit can be metered at one time.

Other connections of metering apparatus are, of course, obvious to anyone dealing with such electric circuits. No particular reliance is placed in this invention on any one such circuit, the type to be employed simply depending upon the number of times the network is to be employed, desired accuracy, etc.

One important result which can be obtained quite rapidly with this analog network is the question of the proper boundaries to be served by each supply point. Obviously, in any arrangement of transportation, such as shown in Figure 1, there are certain use points which will not be supplied from certain supply points. These are represented in the network analog by a substantially infinite resistance between the points in question. For practical purposes, a limit can be set on the top resistance beyond which the circuit, as far as metering is concerned, is open. Such open circuits mark the boundary of the area served by each supply point, or the boundaries may be determined by branches where current flow is zero.

The mechanism of this analyzing network is relatively simple and subject to rapid, convenient variation. It finds application not only in the choice at any one time of the most economical transportation means to be employed but also in such matters of market analysis as to the placement of a new factory, assembly point, supply branch, etc. It is believed apparent from the discussion already given how such an arrangement can be carried out.

In the description given of the network in Figure 1, a battery 18 was shown and all impedances in the various circuits were resistors. It is immediately apparent, however, that each source-point impedance could be equally well adjustable inductances; or, if desired, they could be adjustable capacitances. Similarly, if the supply-point adjustable impedances were inductances, similar inductances could be used for the use-point variable impedances $R_1$, $R_2$, and $R_4$–$R_9$. Other obvious variations will be apparent to those skilled in the art. There is no intent in this specification to be limited to the particular embodiments shown, as the invention is most suitably defined by the appended claims.

We claim:

1. Apparatus for determining by analogy economic transportation between at least one source of goods and a plurality of use points for said goods comprising a source of electric energy, an adjustable impedance connected to said electric source and to a terminal representing the source of goods, a variable impedance for each use point connected to said electric source and to a connection representing one of said use points, and at least one variable resistor connected between each of said connections and said terminal, said resistor representing a means of transportation between the source of goods and a use point, said adjustable impedance and the variable impedance being adjusted so that the current flow therethrough is proportional respectively to the flow of goods from the source of goods and the consumption of said goods at each of said use points, each of said variable resistors being adjusted so that a characteristic thereof is directly proportional to the cost of transportation by one means of transportation along the route between the source of goods and that use point, and means for measuring an electric quantity at each variable resistance proportional to the product of the current flow through said resistance multiplied by said characteristic of said variable resistance.

2. Apparatus according to claim 1 in which the magnitude of each said variable resistor is not more than about 1 per cent of the magnitude of any adjustable impedance or variable impedance in said apparatus.

3. Apparatus in accordance with claim 2 in which said characteristic of said variable resistor is the voltage drop across said resistor and the electric quantity to be measured is the power loss in each said variable resistor.

4. Apparatus in accordance with claim 2 in which said characteristic of said variable resistor is the resistance thereof and the electric quantity to be measured is the voltage drop across said variable resistor.

5. Apparatus for determining by analogy economic transportation between a plurality of sources of goods and a plurality of use points for said goods comprising a source of electric energy, a plurality of adjustable impedances corresponding in number to the number of said sources of goods, each of said adjustable impedances connected to said electric source and to a terminal representing one of said sources of goods, a variable impedance for each use point connected to said electric source and to a connection representing one of said use points, and variable resistors connected between each of said connections and to said terminals in exact relationship to the contemplated flow of goods between the several sources of goods and the various use points, said resistor representing a means of transportation between one source of goods and a use point, said adjustable impedances and the variable impedance being adjusted so that the current flow therethrough is proportional respectively to the flow of goods from each source of goods and the consumption of said goods at each of said use points, each of said variable resistors being adjusted so that a characteristic thereof is directly proportional to the cost of transportation by a means of transportation, along the route between the sources of goods and the use points, and means for measuring an electric quantity at each variable resistance proportional to the product of the current flow through said resistance multiplied by said characteristic of said variable resistance.

6. Apparatus in accordance with claim 5 in which the magnitude of each variable resistor is not more than about 1 per cent of the magnitude of any adjustable impedance or variable impedance in said apparatus.

7. Apparatus in accordance with claim 6 in which said characteristic of said variable resistor is the voltage drop across said resistor and the electric quantity to be measured is the power loss in each said variable resistor.

8. Apparatus in accordance with claim 6 in which said characteristic of said variable resistor is the resistance thereof and the electric quantity to be measured is the voltage drop across said variable resistor.

9. A method of determining by analogy the limit of economic transportation from one of a plurality of sources of goods to a plurality of use points for said goods which comprises adjusting an electrical network connected to a common source of electric energy, so that the current flowing into each of a first set of points is directly proportional to the output of goods from one of said sources of goods, adjusting the current flowing out through each of a second set of points to represent proportionately the consumption of goods at one of said points, interconnecting said first and said second set of points by impedances representing the transportation channels between the sources of goods and the use points for said goods, and measuring the current flow through said impedances to determine points of negligible flow of current, said negligible points of current flow representing economic boundaries of transportation from one of said first to said second set of points.

DANIEL SILVERMAN.
JOSEPH D. EISLER.
JOHN H. HUTH.

REFERENCES CITED

The following references are of record in the file of this patent:

"Hydraulic Analysis of Water Distribution Systems by Means of an Electric Network Analyzer" by T. R. Camp and H. L. Hazen; publication from the Massachusetts Institute of Technology, Serial No. 110, June 1935.

"Co-ordination of Fuel Cost and Transmission Loss by Use of the Network Analyzer to Determine Plant Loading Schedules" by E. E. George, H. W. Page, and J. B. Ward, A. I. E. E. Technical Paper 49-242; September 1949.